United States Patent [19]

Sun

[11] Patent Number: 5,932,512
[45] Date of Patent: Aug. 3, 1999

[54] FLUORINATION OF SYNTHESIZED MOLECULAR SIEVE CATALYSTS FOR INCREASED SELECTIVITY TO ETHYLENE DURING CONVERSION OF OXYGENATES TO OLEFINS

[75] Inventor: Hsiang-ning Sun, Houston, Tex.

[73] Assignee: Exxon Chemical Patents, Inc., Houston, Tex.

[21] Appl. No.: 08/914,918

[22] Filed: Aug. 19, 1997

[51] Int. Cl.⁶ .......................... B01J 27/182; B01J 27/12; B01J 27/16
[52] U.S. Cl. .......................... 502/214; 502/208; 502/224; 502/231; 502/232; 502/240; 502/60; 502/63; 502/64; 502/71; 502/77; 502/85
[58] Field of Search .................... 502/60, 64, 85, 502/208, 214, 224, 231, 232, 240, 63, 67, 71, 77

[56] References Cited

U.S. PATENT DOCUMENTS

| | | | |
|---|---|---|---|
| 4,297,335 | 10/1981 | Lok et al. | 423/328 |
| 4,414,189 | 11/1983 | Kokotailo et al. | 423/328 |
| 4,440,871 | 4/1984 | Lok et al. | 502/214 |
| 4,444,738 | 4/1984 | Suzuki et al. | 423/329 |
| 4,444,900 | 4/1984 | Chang et al. | 502/71 |
| 4,569,833 | 2/1986 | Gortsema et al. | 423/305 |
| 4,588,701 | 5/1986 | Chiang et al. | 502/65 |
| 4,678,766 | 7/1987 | Rosinski | 502/85 |
| 5,098,687 | 3/1992 | Skeels et al. | 423/328 |
| 5,100,644 | 3/1992 | Skeels et al. | 423/328 |
| 5,240,891 | 8/1993 | Patton et al. | 502/66 |
| 5,350,722 | 9/1994 | Joly et al. | 502/64 |
| 5,389,357 | 2/1995 | Sato et al. | 423/714 |
| 5,475,182 | 12/1995 | Janssen | 585/640 |

OTHER PUBLICATIONS

Zeolites, vol. 17, pp. 212–222 (1996) no month available.
Zeolites, vol. 17, pp. 512–522 (1996) no month available.
W. M. Meier & D. H. Olsen, Atlas of Zeolites Structural Types (Butterworth Heineman 3rd ed. 1992) no month available.

*Primary Examiner*—Elizabeth D Wood
*Attorney, Agent, or Firm*—Bradley A. Keller

[57] ABSTRACT

A method for fluorinating molecular sieve catalysts to increase selectivity to ethylene during conversion of oxygenates to olefins, fluorinated catalysts produced by such method, and methods of using the fluorinated molecular sieve catalysts to increase selectivity to ethylene during conversion of oxygenates to olefins.

9 Claims, No Drawings

FLUORINATION OF SYNTHESIZED MOLECULAR SIEVE CATALYSTS FOR INCREASED SELECTIVITY TO ETHYLENE DURING CONVERSION OF OXYGENATES TO OLEFINS

FIELD OF THE INVENTION

The present invention is directed to a method of fluorinating molecular sieve catalysts, to fluorinated catalysts produced by such method, and to a method of using fluorinated catalysts to increase selectivity to ethylene during conversion of oxygenates to olefins.

BACKGROUND OF THE INVENTION

Light olefins (defined herein as "ethylene, propylene, and butylene") serve as feeds for the production of numerous chemicals. Light olefins traditionally are produced by petroleum cracking. Because of the limited supply and/or the high cost of petroleum sources, the cost of producing olefins from petroleum sources has increased steadily.

Alternative feedstocks for the production of light olefins are oxygenates, such as alcohols, particularly methanol, dimethyl ether, and ethanol. Alcohols may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for olefin production.

The catalysts used to promote the conversion of oxygenates to olefins are molecular sieve catalysts. Because ethylene and propylene are the most sought after products of such a reaction, research has focused on which catalysts are most selective to light olefins.

Methods also are needed for increasing the selectivity of molecular sieve catalysts to a particular light olefin, such as ethylene.

SUMMARY OF THE INVENTION

The present invention provides a method for increasing selectivity of a molecular sieve catalyst to ethylene during conversion of oxygenates to olefins. The method comprises: providing a molecular sieve catalyst comprising separately synthesized microporous framework comprising a material selected from the group consisting of silica, alumina, phosphate, and combinations thereof; and, contacting the framework with a fluorinating agent under conditions effective to fluorinate the framework but insufficient to dealuminate the framework. The result is a fluorinated molecular sieve catalyst comprising an amount of fluorine sufficient to increase selectivity of the molecular sieve catalyst to ethylene during conversion of oxygenates to olefins.

DETAILED DESCRIPTION OF THE INVENTION

In the conversion of oxygenates to light olefins, it is desirable to maximize the production of light olefins and to minimize the production of undesired by-products, such as methane, ethane, propane, carbon dioxide, hydrogen gas, and $C_4^+$ materials, including aromatics. It also may be desirable at times to maximize the ethylene or the propylene fraction of the light olefin product. The present invention maximizes the ethylene fraction of the light olefin product by fluorinating the molecular sieve catalyst used to promote the conversion.

Molecular sieve catalysts generally comprise a crystalline, three dimensional, stable framework enclosing cavities of molecular dimensions. The cavities form a well-defined microporous system of channels and cages. The cavities or "pores" in a given type of molecular sieve have well-defined dimensions which will only allow molecules up to a certain size to enter the pores.

The present invention is directed towards increasing the selectivity of substantially any molecular sieve catalyst to ethylene, regardless of pore size. However, preferred catalysts for use in the invention are "small" and "medium" pore molecular sieve catalysts. "Small pore" molecular sieve catalysts are defined as catalysts with pores having a diameter of less than about 5.0 Angstroms. "Medium pore" molecular sieve catalysts are defined as catalysts with pores having a diameter in the range of from about 5 to about 10 Angstroms.

One group of suitable molecular sieve catalysts is the zeolite group. Several types of zeolites exist, each of which exhibit different properties and different utilities. Structural types of zeolites that are suitable for use in the present invention with varying levels of effectiveness include, but are not necessarily limited to AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, and THO and substituted examples of these structural types, as described in W. M. Meier and D. H. Olsen, "Atlas of Zeolite Structural Types," Butterworth-Heineman, Third Edition, 1992, incorporated herein by reference. Structural types of medium pore molecular sieve catalysts useful in the present invention include, but are not necessarily limited to, MFI, MEL, MTW, EUO, MTT, HEU, FER, AFO, AEL, TON, and substituted examples of these structural types, as described in the "Atlas of Zeolite Types," previously incorporated herein by reference.

Preferred zeolite catalysts for use in the present invention include, but are not necessarily limited to, ZSM-5, ZSM-34, erionite, and chabazite.

Silicoaluminophosphates ("SAPO's") are another group of molecular sieve catalysts that are useful in the invention. SAPO's have a three-dimensional microporous crystal framework of $PO_2^+$, $AlO_2^-$, and $SiO_2$ tetrahedral units. Suitable SAPO's for use in the invention include, but are not necessarily limited to SAPO-44, SAPO-34, SAPO-17, and SAPO-18. A preferred SAPO for treatment according to the present invention is SAPO-34, which may be synthesized according to U.S. Pat. No. 4,440,871, incorporated herein by reference, and "Zeolites", Vol. 17, pp. 512–522 (1996), incorporated herein by reference.

SAPO's with added substituents also may be useful in the present invention. These substituted SAPO's form a class of molecular sieves known as "MeAPSO's." Substituents may include, but are not necessarily limited to nickel, cobalt, strontium, barium, and calcium.

In order to fluorinate molecular sieve catalysts according to the present invention, a suitable fluorinating agent is to be dissolved in a suitable solvent, and the solution is to be mixed with the previously synthesized microporous framework for a selected molecular sieve catalyst and simply allowed to stand for a period of time at ambient conditions. Substantially any agent comprising fluorine atoms capable of modifying the catalyst may be used as a fluorinating agent. Preferred fluorinating agents include, but are not necessarily limited to, hydrogen fluoride, ammonium hexafluorosilicate, ammonium hexafluorogermanate, ammonium hexafluorotitanate, ammonium hexafluorophosphate, ammonium hexafluorozirconate, and ammonium hydrogen fluoride. When one of the foregoing preferred materials is used as the fluorinating agent, the mixture comprising the fluorinating agent and the catalyst is to be allowed to stand at ambient conditions for at least about one hour.

Thereafter, the mixture is to be dried for an amount of time sufficient to produce a dry powder. In a preferred embodiment, the mixture is dried at a temperature of about 110° C. for about two hours. The dried powder is to be calcined preferably for about 16 hours at a temperature in the range of from about 300° C. to about 800° C., preferably in the range of from about 350° C. to about 650° C., most preferably in the range of from about 500° C. to about 650° C. The resulting powder may be pressed into pellets and then crushed and sieved to a mesh size preferably in the range of from about 14 to about 20. In a preferred embodiment, the pellets are formed by application of about 138 Mpa (20,000 psi) of pressure.

Without limiting the present invention to a particular mechanism of action, it is believed that the fluorine or fluorine-containing groups in the fluorinating agent replace at least some of the hydroxyl groups found in the catalysts. As a result, the electronegativity of the molecular sieve catalyst is changed. The result is an increased selectivity of the catalyst to ethylene. The presence of silicon, germanium, titanium, zirconium, and/or phosphorous in the fluorinating agents is believed to provide further "fine-tuning" of the selectivity to ethylene.

The process for converting oxygenates to olefins employs an organic starting material (feedstock) preferably comprising "oxygenates." As used herein, the term "oxygenates" is defined to include, but is not necessarily limited to aliphatic alcohols, ethers, carbonyl compounds (aldehydes, ketones, carboxylic acids, carbonates, and the like), and also compounds containing hetero-atoms, such as, halides, mercaptans, sulfides, amines, and mixtures thereof. The aliphatic moiety preferably is in the range of from about 1 to about 10 carbon atoms and more preferably is in the range of from about 1 to about 4 carbon atoms. Representative oxygenates include, but are not necessarily limited to, lower straight chain or branched aliphatic alcohols, their unsaturated counterparts, and their nitrogen, halogen and sulfur analogues. Examples of suitable compounds include, but are not necessarily limited to: methanol; ethanol; n-propanol; isopropanol; $C_4$–$C_{10}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; n-alkyl amines, n-alkyl halides, n-alkyl sulfides having n-alkyl groups of comprising the range of from about 3 to about 10 carbon atoms; and mixtures thereof. As used herein, the term "oxygenate" designates only the organic material used as the feed. The total charge of feed to the reaction zone may contain additional compounds such as diluents.

Preferably, the oxygenate feedstock is to be contacted in the vapor phase in a reaction zone with the defined molecular sieve catalyst at effective process conditions so as to produce the desired olefins, i.e., an effective temperature, pressure, WHSV (Weight Hourly Space Velocity) and, optionally, an effective amount of diluent, correlated to produce olefins. Alternately, the process may be carried out in a liquid or a mixed vapor/liquid phase. When the process is carried out in the liquid phase or a mixed vapor/liquid phase, different conversions and selectivities of feedstock-to-product may result depending upon the catalyst and reaction conditions.

The temperature employed in the conversion process may vary over a wide range depending, at least in part, on the selected catalyst. Although not limited to a particular temperature, best results will be obtained if the process is conducted at temperatures in the range of from about 200° C. to about 700° C., preferably in the range of from about 250° C. to about 600° C., and most preferably in the range of from about 300° C. to about 500° C. Lower temperatures generally result in lower rates of reaction, and the formation of the desired light olefin products may become markedly slow. However, at higher temperatures, the process may not form an optimum amount of light olefin products, and the coking rate may become too high.

Light olefin products will form—although not necessarily in optimum amounts—at a wide range of pressures, including but not limited to autogeneous pressures and pressures in the range of from about 0.1 kPa to about 100 MPa. A preferred pressure is in the range of from about 6.9 kPa to about 34 MPa, most preferably in the range of from about 48 kPa to about 0.34 MPa. The foregoing pressures are exclusive of diluent, if any is present, and refer to the partial pressure of the feedstock as it relates to oxygenate compounds and/or mixtures thereof. Pressures outside of the stated ranges may be used and are not excluded from the scope of the invention. Lower and upper extremes of pressure may adversely affect selectivity, conversion, coking rate, and/or reaction rate; however, light olefins such as ethylene still may form.

The process is to be continued for a period of time sufficient to produce the desired olefin products. The reaction cycle time may vary from tenths of seconds to a number of hours. The reaction cycle time is largely determined by the reaction temperature, the pressure, the catalyst selected, the weight hourly space velocity, the phase (liquid or vapor), and the selected process design characteristics.

A wide range of weight hourly space velocities (WHSV), defined as weight feed per hour per weight of catalyst, for the feedstock will function in the present invention. The WHSV generally is to be in the range of from about 0.01 $hr^{-1}$ to about 5000 $hr^{-1}$, preferably in the range of from about 0.1 $hr^{-1}$ to about 2000 $hr^{-1}$, and most preferably in the range of from about 1 $hr^{-1}$ to about 1000 $hr^{-1}$. The catalyst may contain other materials which act as inerts, fillers, or binders; therefore, the WHSV is calculated on the weight basis of oxygenate and catalyst.

One or more diluents may be fed to the reaction zone with the oxygenates, such that the total feed mixture comprises diluent in a range of from about 1 mol % and about 99 mol %. Diluents which may be employed in the process include, but are not necessarily limited to, helium, argon, nitrogen, carbon monoxide, carbon dioxide, hydrogen, water, paraffins, other hydrocarbons (such as methane), aromatic compounds, and mixtures thereof. Preferred diluents are water and nitrogen.

A preferred embodiment of a reactor system for the present invention is a circulating fluid bed reactor with continuous regeneration, similar to a modern fluid catalytic cracker. Moving beds also may be used. Fixed beds may be used, but are not ideal for the process because oxygenate to olefin conversion is a highly exothermic process which requires several stages with intercoolers or other cooling devices. The reaction also results in a high pressure drop due to the production of low pressure, low density gas.

The invention will be better understood with reference to the following examples which are intended to illustrate, but not to limit the present invention.

EXAMPLE I 0.2588 g of ammonium hexafluorosilicate was dissolved in 4.0 cc of de-ionized water. To this solution was added 4.2218 g of SAPO-34, which was prepared according to U.S. Pat. No. 4,499,327, incorporated herein by reference. This mixture was allowed to stand for one hour at ambient temperature, followed by drying at 110° C. for two hours. This dried powder then was calcined at 650° C. for 16 hours. The powder was pressed under 137.89521 MPa (20,000 psi) to form pellets, which were crushed and sieved to 14–20 mesh size.

EXAMPLE II 0.1105 g of ammonium hexafluorozirconate was dissolved in 4.0 cc of deionized water. To this solution was added 4.2574 g of SAPO-34, which was prepared according to U.S. Pat. No. 4,499,327. This mixture was allowed to stand for one hour at ambient temperature, followed by drying at 110° C. for two hours. This dried powder then was calcined at 650° C. for 16 hours. The powder was pressed under 137.89521 MPa (20,000 psi) to form pellets which were crushed and sieved to 14–20 mesh size.

EXAMPLE III 0.2258 g of ammonium hexafluorophosphate was dissolved in 4.0 cc of de-ionized water. To this solution was added 4.9923 g of SAPO-34 which was prepared according to U.S. Pat. No. 4,499,327. The mixture was allowed to stand for one hour at ambient temperature, followed by drying at 110° C. for two hours. This dried powder then was calcined at 650° C. for 16 hours. The powder was pressed under 137.89521 MPa (20,000 psi) to form pellets, which were crushed and sieved to 14–20 mesh size.

EXAMPLE IV

A sample of 5 cc (approximately 2.7–2.8 grams) each of SAPO-34 catalyst prepared as in U.S. Pat. No. 4,499,327, and the same amount of the SAPO-34-SiF catalyst prepared in Example I, the SAPO-34-ZrF catalyst prepared in Example II, and the SAPO-34-PF catalyst prepared in Example III, were mixed with 15 cc of 3 mm quartz beads and loaded into ¾" (1.9 cm) outer diameter 316 stainless steel tubular reactors which were heated by a three zone electric furnace. The first zone, acting as the preheating zone, vaporized the feed. The temperature of the center zone of the furnaces was adjusted to 450° C. and the exit pressure was maintained at 1.5 psig (112 kPa). The bottom zone temperature was set high enough to ensure that the effluent from the reactor remained in the vapor state. The reactors were first purged with nitrogen at 50 cc/min flow rate for 30 minutes. The feed to each reactor was a 4:1 ratio mixture of distilled water to methanol, respectively. The feed was pumped into the reactors and calibrated to give a flow rate of about 0.8 $hr^{-1}$ WHSV. The effluents were analyzed at pre-determined intervals by on-line gas chromatographs fitted with both thermal conductivity detectors and flame ionization detectors. The following were the results:

| Catalyst | $C_2^=$ (wt %) | $C_3^=$ (wt %) | $C_2^= + C_3^=$ (wt %) |
|---|---|---|---|
| SAPO-34 | 48.6 | 37.6 | 86.2 |
| SAPO-34-ZrF | 54.6 | 34.6 | 89.2 |
| SAPO-34-SiF | 55.9 | 33.2 | 89.1 |

The foregoing results demonstrate that fluorination of a molecular sieve catalyst by the method of this invention increased the selectivity of the particular catalyst to ethylene during the conversion of oxygenates to olefins, while the overall yield of $C_2^=+C_3^=$ remained approximately the same.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for increasing selectivity of a silicoaluminophosphate molecular sieve catalyst to ethylene during conversion of oxygenates to olefins, said method comprising:

(a) providing a silicoaluminophosphate molecular sieve catalyst having a framework; and (b) contacting said silicoaluminophosphate molecular sieve framework with a fluorinating agent under conditions effective to fluorinate said framework but insufficient to dealuminate said framework, forming a fluorinated silicoaluminophosphate molecular sieve catalyst comprising an amount of fluorine sufficient to increase selectivity of said catalyst to ethylene.

2. The method of claim 1 wherein said fluorinating agent is selected from the group consisting of hydrogen fluoride, ammonium hexafluorosilicate, ammonium hexafluorogermanate, ammonium hexafluorotitanate, ammonium hexafluorophosphate, ammonium hexafluorozirconate, and ammonium hydrogen fluoride.

3. The method of claim 1 wherein said framework comprises pores consisting essentially of a diameter in the range of from about 5 to about 10 Angstroms.

4. The method of claim 2 wherein said framework comprises pores consisting essentially of a diameter in the range of from about 5 to about 10 Angstroms.

5. The method of claim 1 wherein said framework comprises pores consisting essentially of a diameter less than about 5 Angstroms.

6. The method of claim 2 wherein said framework comprises pores consisting essentially of a diameter less than about 5 Angstroms.

7. A silicoaluminophosphate molecular sieve catalyst for increasing selectivity of said catalyst to ethylene during conversion of oxygenates to olefins comprising:

(a) a silicoaluminophosphate molecular sieve catalyst having a framework; and (b) fluorine incorporated onto said framework in an amount sufficient to increase selectivity of said silicoaluminophosphate molecular sieve catalyst to ethylene.

8. The molecular sieve catalyst of claim 7 wherein said fluorine comprises a fluorine-containing agent selected from the group consisting of hydrogen fluoride, ammonium hexafluorosilicate, ammonium hexafluorogermanate, ammonium hexafluorotitanate, ammonium hexafluorophosphate, ammonium hexafluorozirconate, and ammonium hydrogen fluoride.

9. The molecular sieve catalyst of claim 7 wherein said framework comprises pores consisting essentially of a diameter in the range of from about 5 to about 10 Angstroms.

* * * * *